United States Patent
Hui et al.

(10) Patent No.: US 10,820,355 B2
(45) Date of Patent: Oct. 27, 2020

(54) METHOD AND APPARATUS FOR RANDOM ACCESS IN MOBILE COMMUNICATION SYSTEM

(71) Applicant: ELECTRONICS AND TELECOMMUNICATIONS RESEARCH INSTITUTE, Daejeon (KR)

(72) Inventors: Bing Hui, Daejeon (KR); Il Gyu Kim, Chungcheongbuk-do (KR); Junhyeong Kim, Daejeon (KR); Gosan Noh, Daejeon (KR); Hee Sang Chung, Daejeon (KR); Sung Woo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 162 days.

(21) Appl. No.: 15/934,320

(22) Filed: Mar. 23, 2018

(65) Prior Publication Data
US 2018/0279364 A1    Sep. 27, 2018

(30) Foreign Application Priority Data

Mar. 24, 2017   (KR) .................. 10-2017-0037828
Mar. 23, 2018   (KR) .................. 10-2018-0034090

(51) Int. Cl.
*H04W 56/00*   (2009.01)
*H04W 74/08*   (2009.01)
(Continued)

(52) U.S. Cl.
CPC ........ *H04W 74/085* (2013.01); *H04B 7/0695* (2013.01); *H04B 7/088* (2013.01);
(Continued)

(58) Field of Classification Search
None
See application file for complete search history.

(56) References Cited

U.S. PATENT DOCUMENTS

2016/0345216 A1* 11/2016 Kishiyama ............ H04W 36/30
2017/0072816 A1   3/2017 Lippman et al.
(Continued)

FOREIGN PATENT DOCUMENTS

KR   10-2016-0142054 A   12/2016
KR   10-2017-0085428 A    7/2017

OTHER PUBLICATIONS

"RAN1 Chairman's Notes", 3GPP TSG RAN WG1 Meeting #88, Feb. 13-17, 2017.
(Continued)

*Primary Examiner* — Kodzovi Acolatse
(74) *Attorney, Agent, or Firm* — Rabin & Berdo, P.C.

(57) ABSTRACT

A method and an apparatus for random access in a mobile communication system are provided. A terminal receives a synchronization signal block, obtains beam index information from the received synchronization signal block, and transmits a preamble message occupying a plurality of preamble resources including a preamble resource corresponding to the beam index information to a base station. A random access resource includes a plurality of preamble resources, and the synchronization signal block is specified for one beam and corresponds to one preamble resource of the random access resource.

19 Claims, 14 Drawing Sheets

(51) Int. Cl.
*H04W 16/28* (2009.01)
*H04B 7/08* (2006.01)
*H04B 7/06* (2006.01)
*H04L 5/00* (2006.01)

(52) U.S. Cl.
CPC ......... *H04W 16/28* (2013.01); *H04W 56/001* (2013.01); *H04W 74/0833* (2013.01); *H04L 5/0007* (2013.01)

(56) References Cited

U.S. PATENT DOCUMENTS

| | | | |
|---|---|---|---|
| 2017/0201974 A1 | 7/2017 | Sohn et al. | |
| 2017/0207843 A1 | 7/2017 | Jung et al. | |
| 2017/0251460 A1* | 8/2017 | Agiwal | H04W 72/0406 |
| 2018/0049245 A1* | 2/2018 | Islam | H04W 72/042 |
| 2018/0124837 A1* | 5/2018 | Yu | H04B 7/0404 |
| 2018/0219606 A1* | 8/2018 | Ng | H04B 7/0617 |
| 2018/0279380 A1* | 9/2018 | Jung | H04W 74/0833 |
| 2019/0045377 A1* | 2/2019 | Kakishima | H04B 7/063 |
| 2019/0104549 A1* | 4/2019 | Deng | H04L 27/2607 |
| 2019/0158337 A1* | 5/2019 | Yoon | H04L 27/2692 |
| 2019/0173719 A1* | 6/2019 | Qin | H04J 11/0073 |
| 2019/0215119 A1* | 7/2019 | Kim | H04L 5/005 |
| 2019/0281510 A1* | 9/2019 | Yilmaz | H04W 36/0058 |
| 2019/0281624 A1* | 9/2019 | Kim | H04W 74/004 |
| 2019/0281627 A1* | 9/2019 | Malkov | H04W 74/085 |
| 2019/0320430 A1* | 10/2019 | Kim | H04W 72/0446 |
| 2019/0327764 A1* | 10/2019 | Yoo | H04W 74/085 |
| 2020/0008247 A1* | 1/2020 | Kwak | H04W 74/0841 |
| 2020/0053788 A1* | 2/2020 | Wang | H04W 74/08 |
| 2020/0068616 A1* | 2/2020 | Qian | H04W 80/08 |
| 2020/0099437 A1* | 3/2020 | Harada | H04W 72/046 |

OTHER PUBLICATIONS

"3rd Generation Partnership Project; Technical Specification Group Radio Access Network; Study on New Radio (NR) Access Technology; Physical Layer Aspects", (Release 14), 3GPP TR 38.802 V1.3.0 (Feb. 2017).

R1-1706143, "On beam specific RAR", 3GPP TSG RAN WG1 Meeting #88bis, Apr. 3-7, 2017.

R1-1704945, "On beam specific RAR", 3GPP TSG RAN WG1 Meeting #88bis, Apr. 3-7, 2017.

* cited by examiner

METHOD AND APPARATUS FOR RANDOM ACCESS IN MOBILE COMMUNICATION SYSTEM

CROSS-REFERENCE TO RELATED APPLICATION

This application claims priority to and the benefit of Korean Patent Application Nos. 10-2017-0037828 and 10-2018-0034090 filed in the Korean Intellectual Property Office on Mar. 24, 2017 and Mar. 23, 2018, the entire contents of which are incorporated herein by reference.

BACKGROUND OF THE INVENTION

(a) Field of the Invention

The present invention relates to a method and an apparatus for random access in a mobile communication system.

(b) Description of the Related Art

Beamforming technology is one of next generation communication technologies for processing wireless data traffic that are expanding. The beamforming-based mobile communication system uses a high frequency band to transmit signals, and beamforming can be performed in a base station and a terminal such that a beam forming gain is increased in a specific direction using a large number of antennas. In a beamforming-based mobile communication system, a beam sweeping operation is performed to transmit or receive a signal while changing a plurality of beams.

In a beamforming-based mobile communication system, a base station and a terminal operate a plurality of beams, and the base station transmits a reference signal for each beam so that the terminal can measure a channel state of each beam. For example, if the terminal informs the base station of the optimal transmission beam index of the base station, the base station transmits data to the terminal using the optimal transmission beam.

Meanwhile, efforts have been made to develop an improved 5th generation (5G) communication system to meet the demand of wireless data traffic which has been increasing since the commercialization of the 4th generation (4G) communication system. In this next generation communication system, a preamble format for random access is defined in order to support single beam and multi-beam operation, and a preamble having a defined format in a random access procedure is transmitted.

However, in the next generation communication system, a mechanism for informing the beam index is not defined. Therefore, when the beam correspondence at a base station is not known, a problem such as terminals receiving a plurality of random access responses (RARs) occurs, and the random access procedure becomes complicated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for random access having advantages of designing an association between signals and resources for random access and performing random access in a mobile communication system using multi-beams.

An exemplary embodiment of the present invention provides a method for random access in a multi-beam-based mobile communication system, including: receiving, by a terminal, a synchronization signal block and obtaining beam index information from the received synchronization signal block; and transmitting, by the terminal, a preamble message occupying a plurality of preamble resources including a preamble resource corresponding to the beam index information to a base station, wherein a random access resource includes a plurality of preamble resources, and the synchronization signal block is specified for one beam and corresponds to one preamble resource of the random access resource.

The terminal may recognize a beam corresponding to the obtained beam index information as an optimal downlink transmission beam, and the transmitting of a preamble message may include transmitting a preamble message occupying a plurality of preamble resources including a central preamble resource corresponding to the beam index information and preamble resources which are located on the left and right of the central preamble resource corresponding to the beam index information to a base station.

A beam specified for a preamble resource located in the middle among the preamble resources on which the preamble message is transmitted may be recognized by the base station as an optimal downlink transmission beam for the terminal.

When beam grouping is performed, a burst including a plurality of synchronization signal blocks may correspond to one random access resource, and synchronization signal blocks of the one burst may correspond to different preamble resources in the random access resource.

The obtaining of beam index information may include: receiving, by the terminal, a plurality of synchronization signal blocks from the base station; selecting, by the terminal, a synchronization signal block corresponding to a direction of the terminal from among the plurality of synchronization signal blocks; and decoding, by the terminal, the selected synchronization signal block to obtain the beam index information.

The random access resource may include a plurality of preamble resources and a guard time (GT) resource, and wherein the transmitting of a preamble message may include, when an optimal beam recognized according to the beam index information is a first or last beam and a length of the preamble message is predetermined, selecting preamble resources from a first preamble resource or a last preamble resource of the random access resource by the length of the preamble message and transmitting a preamble message by using the selected preamble resources.

The method may further include: after the transmitting of a preamble message, receiving, by the terminal, at least one random access response (RAR) transmitted on RAR resources selected through a RAR selection procedure from the base station; selecting, by the terminal, a RAR from among a plurality of RARs when receiving the plurality of RARs; and recognizing, by the terminal, that a beam corresponding to the selected RAR is an optimal uplink reception beam.

The RAR resource may be specified to one beam and corresponds to one preamble resource of the random access resource, and wherein the selecting of a RAR from among a plurality of RARs may include, when a plurality of terminals are respectively located in different cover ridges and each terminal transmits a preamble message including a different preamble sequence, selecting one RAR from among the plurality of RARs based on the preamble sequence used in the preamble message transmission.

The RAR resource may be specified to one beam and corresponds to one preamble resource of the random access resource, and wherein the selecting of a RAR from among a plurality of RARs may include, when a plurality of terminals are respectively located in different cover ridges and each terminal transmits a preamble message including the same preamble sequence, selecting one RAR having maximum reception power.

The RAR selection procedure at the base station may be performed based on a preamble message having maximum reception power among the plurality of preamble messages, and a beam corresponding to a preamble resource on which the preamble message having maximum reception power is transmitted may be selected as an optimal beam, and wherein the RAR from the base station may be transmitted on RAR resources corresponding to the selected optimal beam.

Another embodiment of the present invention provides a method for random access in a multi-beam-based mobile communication system, including: transmitting, by a base station, synchronization signal blocks; receiving, by the base station, a preamble message occupying a plurality of preamble resources from a terminal; and recognizing, by the base station, a beam specified to a synchronization signal block corresponding to a preamble resource on which the preamble message is transmitted as an optimal downlink transmission beam for the terminal, wherein a random access resource includes a plurality of preamble resources, and the synchronization signal block is specified for one beam and corresponds to one preamble resource of the random access resource.

The recognizing may include recognizing a beam specified for a synchronization signal block corresponding to a preamble resource located in the middle among the preamble resources on which the preamble message is transmitted as an optimal downlink transmission beam for the terminal.

The preamble message may be transmitted by using a plurality of preamble resources including a preamble resource corresponding to beam index information obtained from the synchronization signal blocks and preamble resources which are located on the left and right of the preamble resource corresponding to the beam index information.

The method may further include: after the recognizing, selecting, by the base station, an optimal uplink reception beam for the terminal by beam sweeping; and transmitting, by the base station, a random access response (RAR) on RAR resources corresponding to the selected beam, wherein the RAR resource is specified to one beam and corresponds to one preamble resource of the random access resource.

The selecting of an optimal uplink reception beam may include selecting an optimal uplink reception beam based on maximum reception power.

Yet another embodiment of the present invention provides a method for random access in a multi-beam-based mobile communication system, including: monitoring, by a terminal, resources with a resource window of a fixed length after transmitting a preamble message; receiving, by the terminal, at least one random access response (RAR) transmitted on RAR resources selected through a RAR selection procedure from the base station according to the monitoring; selecting, by the terminal, a RAR from among a plurality of RARs when receiving the plurality of RARs; and recognizing, by the terminal, that a beam corresponding to the selected RAR is an optimal uplink reception beam, wherein a random access resource includes a plurality of preamble resources, and the RAR resource is specified to one beam and corresponds to one preamble resource of the random access resource.

The selecting of a RAR from among a plurality of RARs may include, when a plurality of terminals are respectively located in different cover ridges and each terminal transmits a preamble message including a different preamble sequence, selecting one RAR from among the plurality of RARs based on the preamble sequence used in the preamble message transmission.

The selecting of a RAR from among a plurality of RARs may include, when a plurality of terminals are respectively located in different cover ridges and each terminal transmits a preamble message including the same preamble sequence, selecting one RAR having maximum reception power.

The method may further include: before the monitoring, receiving, by the terminal, a synchronization signal block and obtaining beam index information from the received synchronization signal block; and transmitting, by the terminal, the preamble message occupying a plurality of preamble resources including a preamble resource corresponding to the beam index information to the base station, wherein the synchronization signal block is specified for one beam or one beam group and corresponds to one preamble resource of the random access resource.

The transmitting of the preamble message may include transmitting the preamble message by using a plurality of preamble resources including a preamble resource corresponding to the beam index information and preamble resources which are located on the left and right of the preamble resource corresponding to the beam index information.

DETAILED DESCRIPTION OF THE EMBODIMENTS

Figure 1:
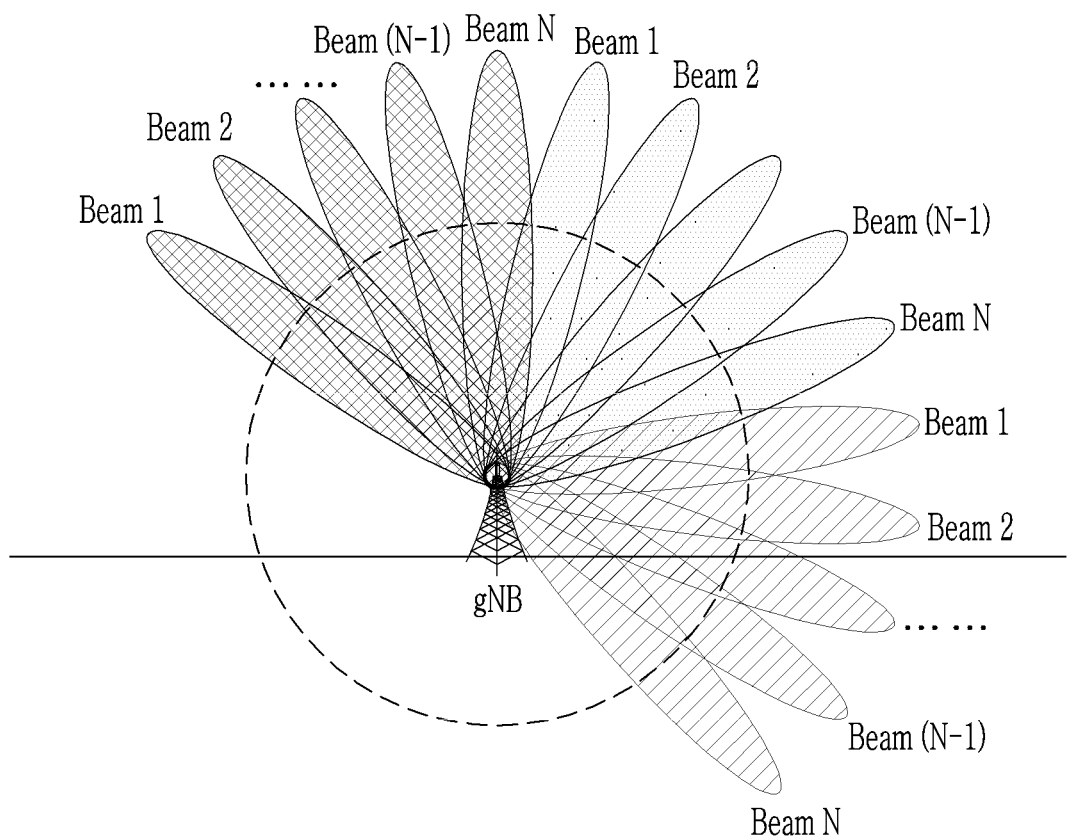
FIG. 1 shows multi-beam directions.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and the claims, unless explicitly described to the contrary, "comprising" any components will be understood to imply the inclusion of other components rather than the exclusion of other components.

Throughout the present specification, a terminal may indicate user equipment (UE), a mobile terminal (MT), a mobile station (MS), an advanced mobile station (AMS), a high reliability mobile station (HR-MS), a subscriber station (SS), a portable subscriber station (PSS), an access terminal (AT), and the like, and may include all or some of functions of the UE, the MT, the MS, the AMS, the HR-MS, the SS, the PSS, the AT, and the like.

In addition, a base station (BS) may indicate an advanced base station (ABS), a high reliability base station (HR-BS), a node B, an evolved node B, (eNodeB or eNB), gNB, an access point (AP), a radio access station (RAS), a base transceiver station (BTS), a mobile multihop relay (MMR)-BS, a relay station (RS) serving as the base station, a relay node (RN) serving as the base station, an advanced relay station (ARS) serving as the base station, a high reliability relay station (HR-RS) serving as the base station, small base stations [a femto base station (femto BS), a home node B (HNB), a home eNodeB (HeNB), a pico base station (pico BS), a metro base station (metro BS), a micro base station (micro BS), and the like], and the like, and may include all or some of functions of the ABS, the HR-BS, the node B, the eNodeB, the eNB, the gNB, the AP, the RAS, the BTS, the MMR-BS, the RS, the RN, the ARS, the HR-RS, the small base stations, and the like.

Expressions described as singular may be interpreted as singular or plural unless an explicit expression such as "one" or "single" is used.

A mobile communication system according to an exemplary embodiment of the present invention may be applied to various wireless communication networks. For example, a mobile communication system may be applied to a present radio access technology (RAT)-based wireless communication network, or a 5th generation (5G) or later wireless communication networks. A new RAT-based 5G standard that satisfies the IMT-2020 requirements is developing in the 3rd Generation Partnership Project (3GPP), and the new RAT is referred to as new radio (NR). For convenience of explanation in an exemplary embodiment of the present invention, an NR-based mobile communication system will be described as an example, but the embodiment of the present invention is not limited to this and can be applied to various mobile communication systems.

One of the other features of the NR-based mobile communication system compared with the existing 3GPP system such as a code division multiple access (CDMA) system or a long term evolution (LTE) system is that it utilizes a wide range of frequency bands for increasing transmission capacity. As a waveform technique for the NR-based mobile communication system, orthogonal frequency division multiplexing (OFDM), filtered OFDM, generalized frequency division multiplexing (GFDM), filter bank multi-carrier (FBMC), and the like are being discussed as candidate technologies. In the embodiment of the present invention, cyclic prefix-based OFDM (CP-OFDM) will be described as an example of a waveform technique, but the embodiments of the present invention are not limited thereto. Meanwhile, the CP-OFDM may include CP-OFDM or spread spectrum OFDM (e.g., DFT-spread OFDM) techniques with windowing and/or filtering.

A Frequency band of the NR-based mobile communication system, for example, a frequency band of 700 MHz to 100 GHz, may be divided into a low frequency band (e.g., 6 GHz), a high frequency band (e.g., 3 GHz to 40 GHz), and a very high frequency band (30 GHz to 100 GHz). Different OFDM parameters may be applied to each frequency band. The OFDM parameters may include a subcarrier interval, a CP length, and an OFDM symbol length, and may further include a system bandwidth, sampling speed, a fast Fourier transform (FFT) size, and the like.

Hereinafter, a method and an apparatus for random access according to an exemplary embodiment of the present invention will be described.

FIG. 1 shows multi-beam directions.

As shown in FIG. 1, beams used in a base station are grouped in a multi-beam communication environment, and each beam group may include N beams.

For best transmission beam detection in a multi-beam communication environment, beam sweeping on transmission beams of various directions is performed. Beam sweeping is performed based on analog beam forming, and then a synchronization signal (SS) burst set is designed to include multi-SS bursts in a time domain.

Figure 2:
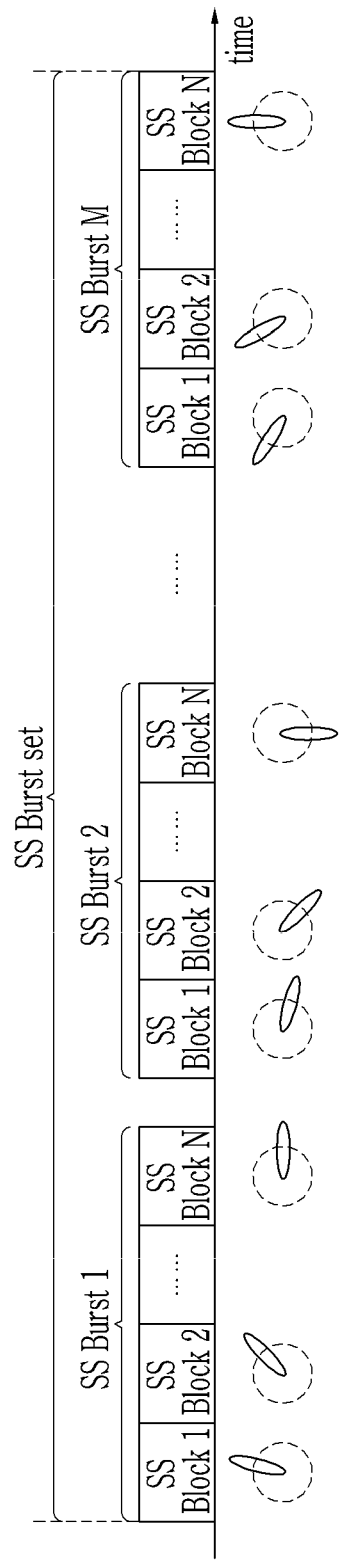
FIG. 2 shows an example of a synchronization signal (SS) burst set.

FIG. 2 shows an example of a synchronization signal (SS) burst set.

As shown in FIG. 2, an SS burst set includes one SS burst or a plurality of SS bursts, and an SS burst includes at least one SS block. The structure as in FIG. 2 may be considered to be an SS structure suitable for a single beam or multi-beam operation.

One SS burst may correspond to a beam group. SS blocks of an SS burst may be sequentially arranged to correspond to different beams of a beam group.

Figure 3:
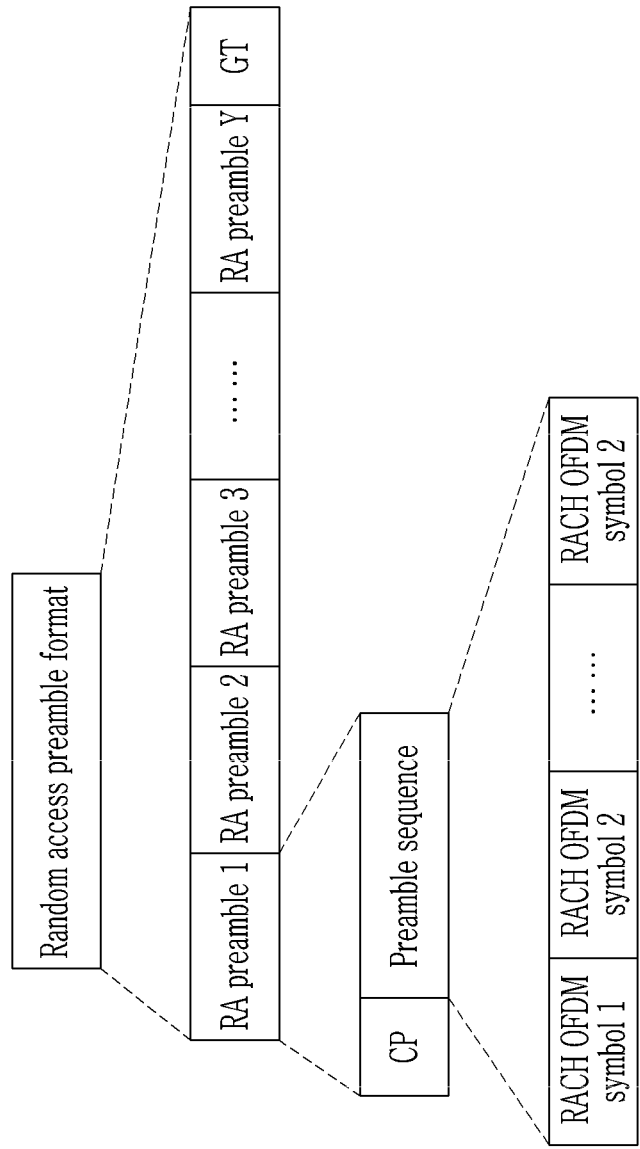
FIG. 3 shows an example of a random access (RA) preamble format.

Meanwhile, for a physical random access channel (PRACH) which is a set of time-frequency resources or resource elements carrying a random access signal, the format of a random access (RA) preamble for supporting is as shown in FIG. 3.

FIG. 3 shows a format of an RA preamble.

As shown in FIG. 3, a format of an RA preamble includes Y RA preambles and a guard time (GT). One RA preamble includes a cyclic prefix (CP) and a preamble sequence. The CP is not only used for compensating multi-path delay, but is also used for covering the time delay due to beam sweeping. The preamble sequence includes one or Z symbols (also known as a RACH (Random Access Channel) OFDM symbol). Here, Y and X represent a positive integer. The Y may be associated with the number of transmitter (Tx) beams and receiver (Rx) beams in a base station. The Tx beam may be referred to as a transmission beam and the Rx beam may be referred to as a reception beam.

A plurality of RA preambles are used for Rx beam sweeping in a base station. A terminal transmits a message by using an RA preamble format in an RA procedure. The message using an RA preamble format may be referred to as a preamble message or an Msg.1.

The structure of a PRACH used in an NR system is preferably designed to be suitable for a single beam and multi-beam operation, and to be suitable for both when there is beam correspondence and when there is no beam correspondence.

When there is no beam correspondence at a base station, beam index information needs to be carried through information transmitting/receiving during an initial access. However, for a next generation mobile communication system such as an NR system, the mechanism for informing a beam index during an initial access has not yet been defined.

In an exemplary embodiment of the present invention, an association among an SS block, a PRACH resources, and an RA response (RAR) is defined and a random access is performed based on the association.

The PRACH resource represents a time-frequency resource or a resource element (RE) allocated to a PRACH. The expression "to transmit the PRACH" may be used with the meaning of transmitting a random access signal on the PRACH or through the PRACH. The PRACH resource may be referred to as a "random access resource".

For example, it is assumed that a Tx beam and an Rx beam have the same direction at a base station for simplifying descriptions. If a terminal does not obtain beam correspondence information, a base station performs Rx beam sweeping to find an optimal beam for the terminal, which is for beam calibration.

Figure 4:
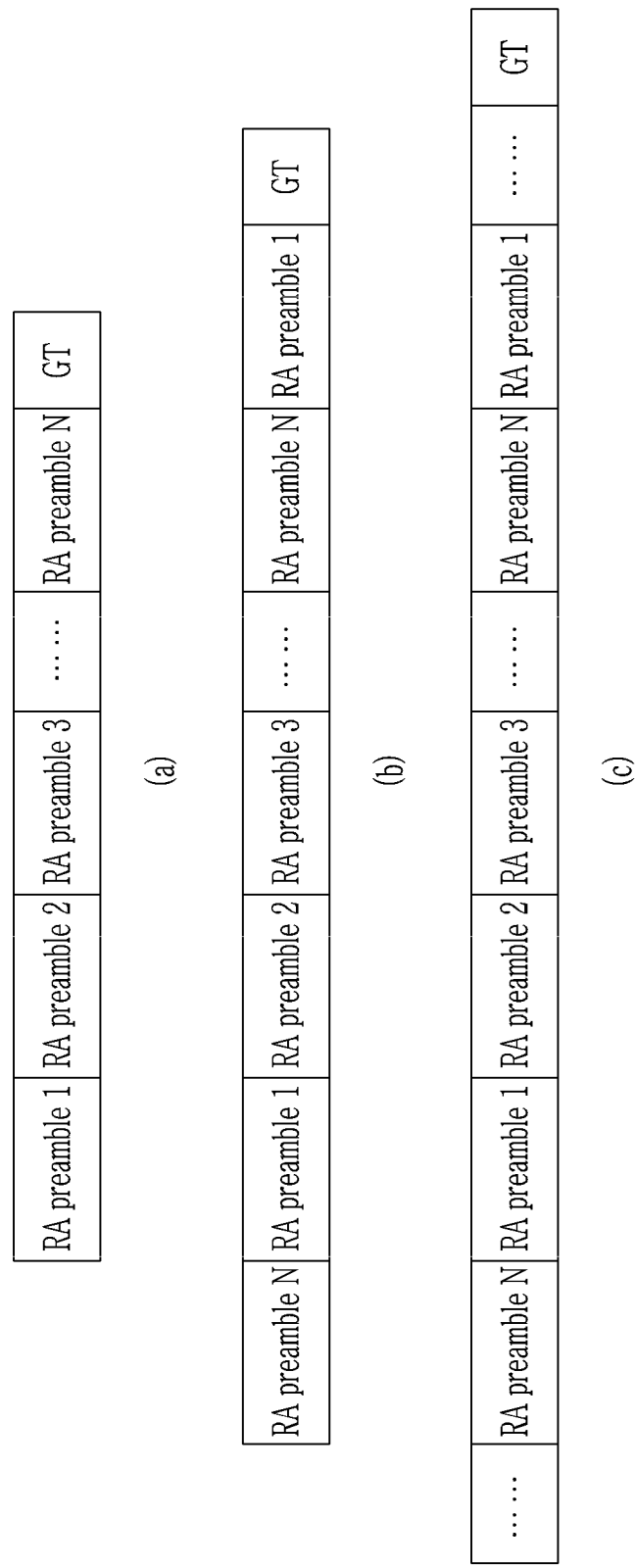
FIG. 4 shows a structure of a physical random access channel (PRACH) resource according to an exemplary embodiment of the present invention.

FIG. 4 shows a structure of a PRACH resource according to an exemplary embodiment of the present invention.

The PRACH resource according to an exemplary embodiment of the present invention includes, as shown in FIG. 4, a plurality of RA preamble resources and a GT resource. When assuming that there are a total of N beams at a base station without beam grouping, the PRACH resource may be basically structured as in (a) of FIG. 4. At least N RA preamble resources in the PRACH may be required for Rx beam sweeping in a base station as in (a) of FIG. 4.

Figure 5:
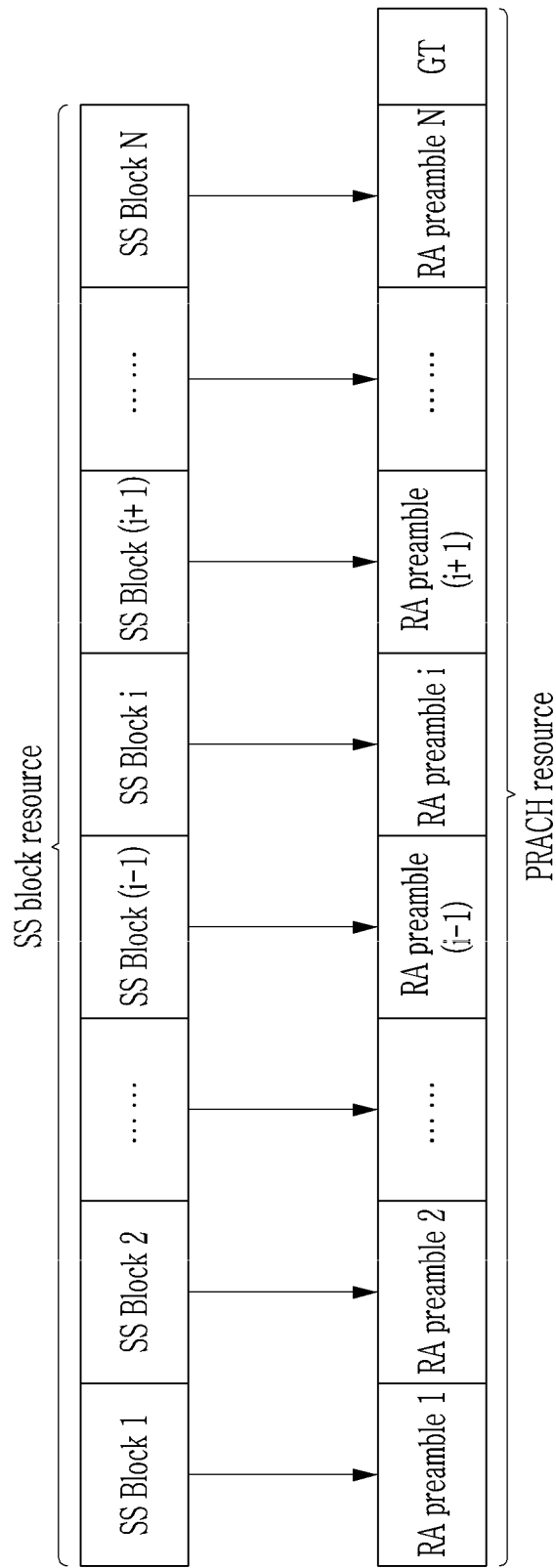
FIG. 5 shows an association between an SS block resource and a PRACH resource according to a first exemplary embodiment of the present invention.

FIG. 5 shows an association between an SS block resource and a PRACH resource according to a first exemplary embodiment of the present invention.

In the first exemplary embodiment of the present invention, as shown in FIG. 5, one SS block may correspond to one RA preamble resource of the PRACH resource. One SS block includes a primary SS (PSS), a secondary SS (SSS), and a physical broadcast channel (PBCH).

Figure 6:
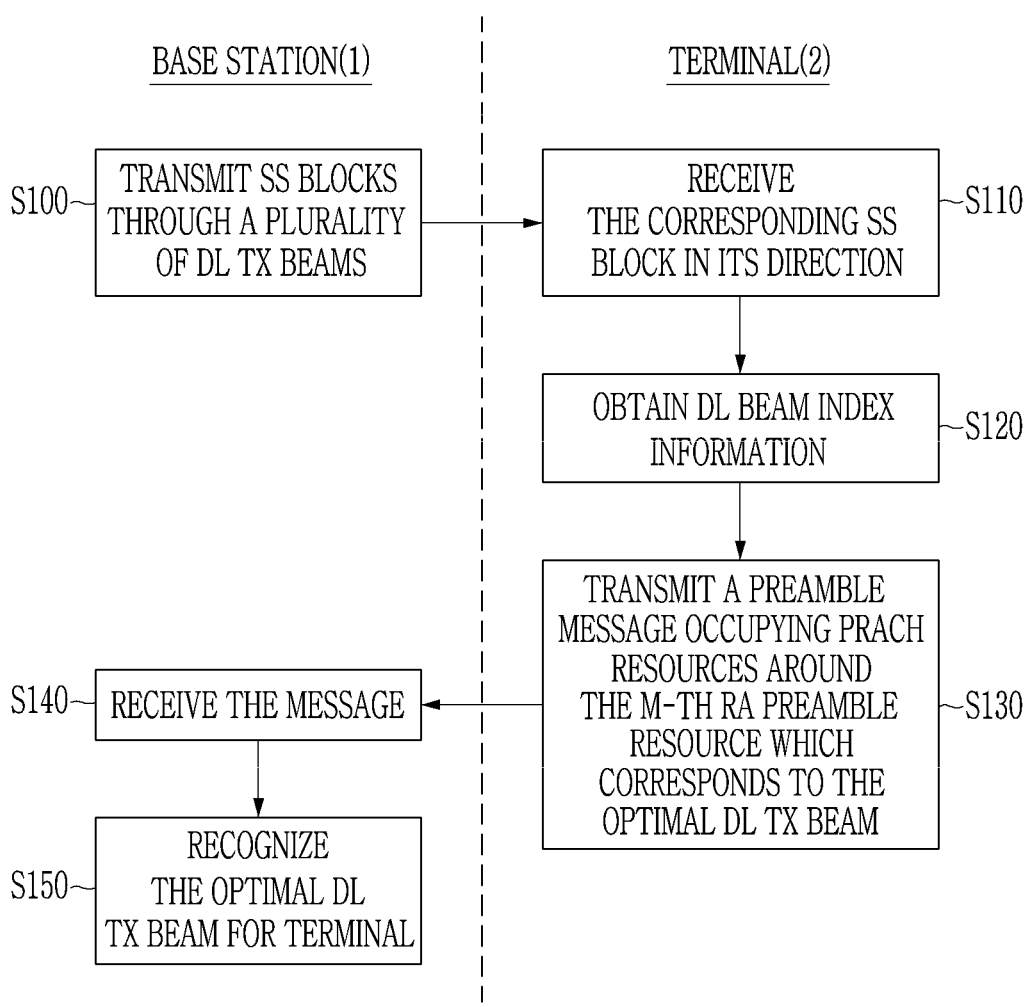
FIG. 6 shows a flowchart of a method for random access according to the first exemplary embodiment of the present invention.

FIG. 6 shows a flowchart of a method for random access according to a first exemplary embodiment of the present invention.

As noted above, in a situation in which there is an association such that one SS block corresponds to one RA preamble resource of the PRACH resource, as shown in FIG. 6, a base station 1 transmits SS blocks through a plurality of downlink (DL) Tx beams (S100), and a terminal 2 first detects the SS blocks during an initial access (S110). As the base station 1 transmits the SS blocks through the plurality of DL Tx beams, a terminal located in a specific direction may receive the corresponding SS block in its direction. That is, the SS blocks transmitted by the base station are beam-specific. Also, the same SS block is transmitted through multiple beams and the SS block may be beam-group specific. The SS block carries DL beam index information of the base station.

The terminal 2 detects the SS block corresponding to its direction and obtains the DL beam index information of the base station 1 based on the detected SS blocks (S120). For example, when receiving the m-th SS block, the terminal 2 decodes the m-th SS block and then obtains the DL beam index information of the base station 1, that is, m. Here, the m represents a DL beam index of a base station.

The terminal 2 recognizes that the beam corresponding to the DL beam index m is an optimal beam. The information on the optimal beam, that is, the optimal DL Tx beam index m, is informed to the base station 1 during an RA procedure. As the base station 1 does not hold beam correspondence, the terminal 2 transmits a preamble format including a plurality of preambles for Rx beam sweeping at a base station, that is, a preamble message (Msg.1).

Here, it is assumed that Tx multi-beam directions are the same as Rx multi-beam directions at a base station.

The terminal 2 transmits a preamble message (Msg.1) occupying PRACH resources around the m-th RA preamble resource which corresponds to the optimal DL beam for Rx beam calibration at a base station 1 (S130). For example, based on the optimal DL Tx beam index m, a preamble message (Msg. 1) occupying the m−1th RA preamble resource, the m-th RA preamble resource, and the m+1th RA preamble resource of the PRACH resource is transmitted.

The base station 1 receives the preamble message (Msg.1) (S140), and then selects three RA preamble resources around the m-th RA preamble resource so that it is possible to recognize that the optimal DL Tx beam for the terminal 2 is the m-th beam (S150). That is, based on the m−1th RA preamble resource, the m-th RA preamble resource, and the m+1th RA preamble resource on which the preamble message (Msg.1) is transmitted, it is recognized that the m-th beam corresponding to the m-th RA preamble resource located at the center is the optimal DL Tx beam for the terminal 2.

Figure 7:
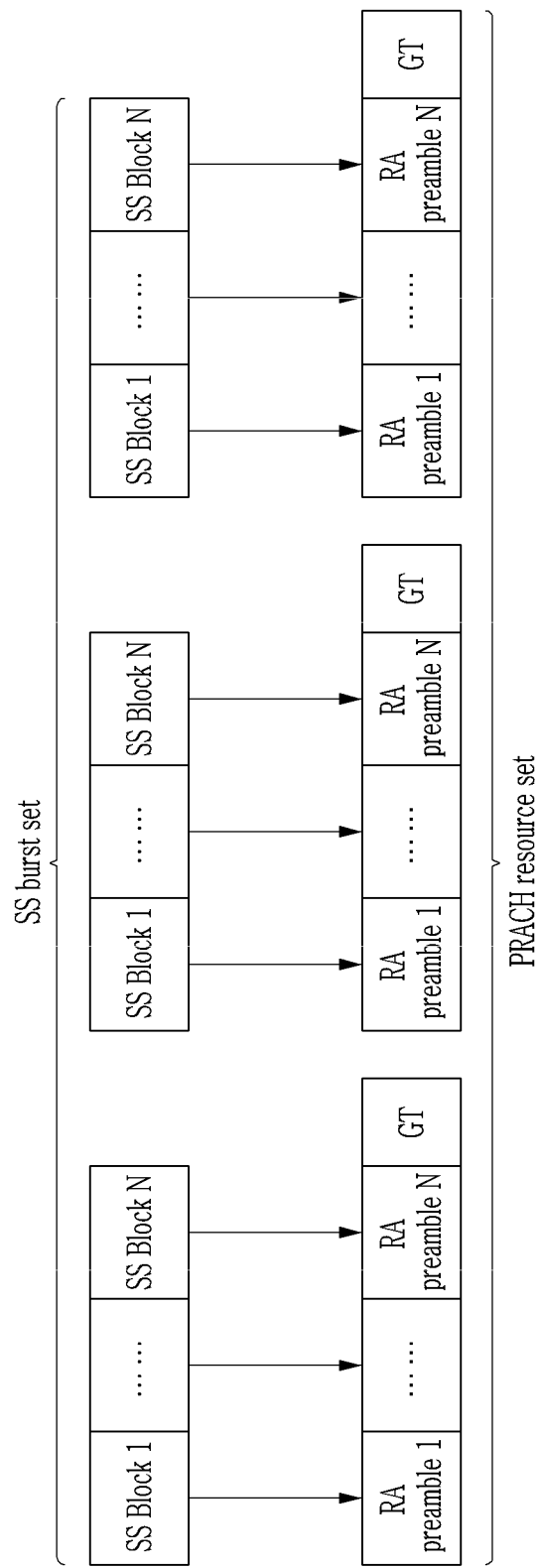
FIG. 7 shows an association between an SS block resource and a PRACH resource in beam grouping according to a second exemplary embodiment of the present invention.

FIG. 7 shows an association between an SS block resource and a PRACH resource in beam grouping according to a second exemplary embodiment of the present invention.

As shown in FIG. 7, in the second exemplary embodiment of the present invention, an association between an SS burst set and RA preamble resources of a PRACH resource set according to beam grouping is defined. The SS burst set includes a plurality of SS bursts, and each SS burst includes SS blocks that are located consecutively. The PRACH resource includes a plurality of PRACH resources, and each PRACH resource may have a structure as shown in (a) of FIG. 4. Each SS burst corresponds to a PRACH resource. SS blocks of a SS burst correspond to different RA preamble resources of a PRACH resource.

The method according to the first exemplary embodiment of the present invention as noted above may be applied to the second exemplary embodiment of the present invention.

Figure 8:
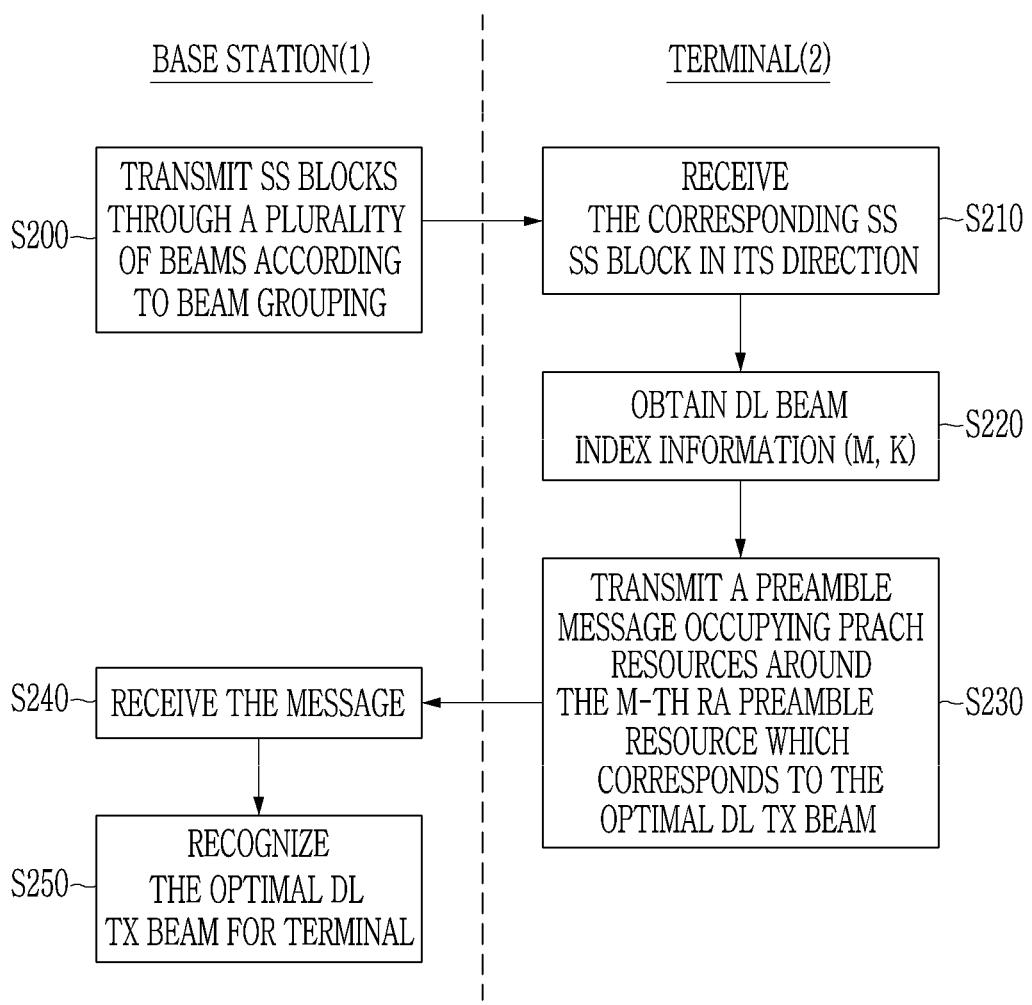
FIG. 8 shows a flowchart of a method for random access according to the second exemplary embodiment of the present invention.

FIG. 8 shows a flowchart of a method for random access according to a second exemplary embodiment of the present invention.

As shown in FIG. 8, a base station 1 transmits SS blocks through a plurality of downlink (DL) Tx beams (S200), a terminal 2 first detects the SS blocks during an initial access (S210). The SS block carries DL beam index information of a base station. Here, the DL beam index information may include a beam group index corresponding to a group index for a PRACH resource and a beam index corresponding to an RA preamble resource index of a PRACH resource according to beam grouping.

The terminal 2 receives the SS block corresponding to its direction, and decodes the SS block to obtain the DL beam index information of the base station 1 (S220). For example, when receiving the m-th SS block, the terminal 2 decodes the m-th SS block and then obtains the DL beam index information of the base station 1, that is, m and k. Here, the m represents a DL beam index of a base station and the k represents an index of a beam group in which the DL beam index is included.

The terminal 2 recognizes that the beam corresponding to the DL beam index information (m and k) is an optimal beam. The information on the optimal beam, that is, the optimal DL Tx beam information (m and k), may informed to the base station 1 during an RA procedure. Here, it is assumed that Tx multi-beam directions are the same as Rx multi-beam directions at a base station.

The terminal 2 transmits a preamble message (Msg.1) occupying PRACH resources around the m-th RA preamble resource of the k-th group which corresponds to the optimal DL beam for Rx beam calibration at a base station 1 (S230). For example, based on the optimal DL Tx beam index m and k, a preamble message (Msg. 1) occupying the (m−1)th RA preamble resource, the m-th RA preamble resource, and the (m+1)th RA preamble resource of the k-th PRACH resource is transmitted.

The base station receives the preamble message (Msg.1) (S240), and then selects three RA preamble resources around the m-th RA preamble resource in the k-th PRACH resource group so that it is possible to recognize that the optimal DL Tx beam for the terminal 2 is the m-th beam corresponding to the m-th RA preamble resource of the k-th PRACH resource (S250).

In the exemplary embodiment of the present invention, a terminal may not need to feedback m (a beam index within a group) and k (a beam group index). The SS blocks may be transmitted through multiple beam groups simultaneously and in parallel. In this case, a termianl may only feedback the beam index within a group (k) and a base station may recognize both m and k since the base station may generally know the direction of the terminal based on the UL Rx beam direction of the termonal.

Meanwhile, for reasons such as terminal mobility or an SS block detection error, there is a possibility that the optimal UL Rx beam for the terminal is determined to not be the m-th beam. After UL Rx beam sweeping, a base station may recognize that the optimal UL Rx beam for the terminal is the (m−1)th beam. In this case, the base station may feed back the optimal UL Rx beam information to the terminal so that the terminal completes the beam calibration and reestablishes the beam correspondence of the base station. The beam index feedback may be implemented using the association between the RACH resource and the RAR according to an embodiment of the present invention.

The length of the RA preamble format used by a terminal to transmit the preamble message (Msg. 1) may be a variable value, and for example, a value of "3" may be used. By using several RA preamble resources around the RA preamble resources corresponding to the optimal DL Tx beam of the terminal, some tolerance for a Tx/Rx beam correspondence error may be given. If the length of the RA preamble format is "3" and multiple RA preamble resources around the resource corresponding to the optimal DL Tx beam of the terminal are selected, the PRACH resource structure may be as shown in (b) of FIG. 4. The PRACH resource structure as shown in (b) of FIG. 4 is used in consideration of resource occupation for the first beam and the N-th beam. That is, if the optimal DL Tx beam of the terminal is the first beam or the last beam, since the N-th beam (or the last beam) is physically adjacent to the first beam, the terminal transmits a preamble message (Msg.1) occupying the first three RA preamble resources or the last three RA preamble resources. Based on this, the PRACH resource structure may be configured as shown in (c) of FIG. 4 so as to be suitable for the length of the variable RA preamble format.

Figure 9:
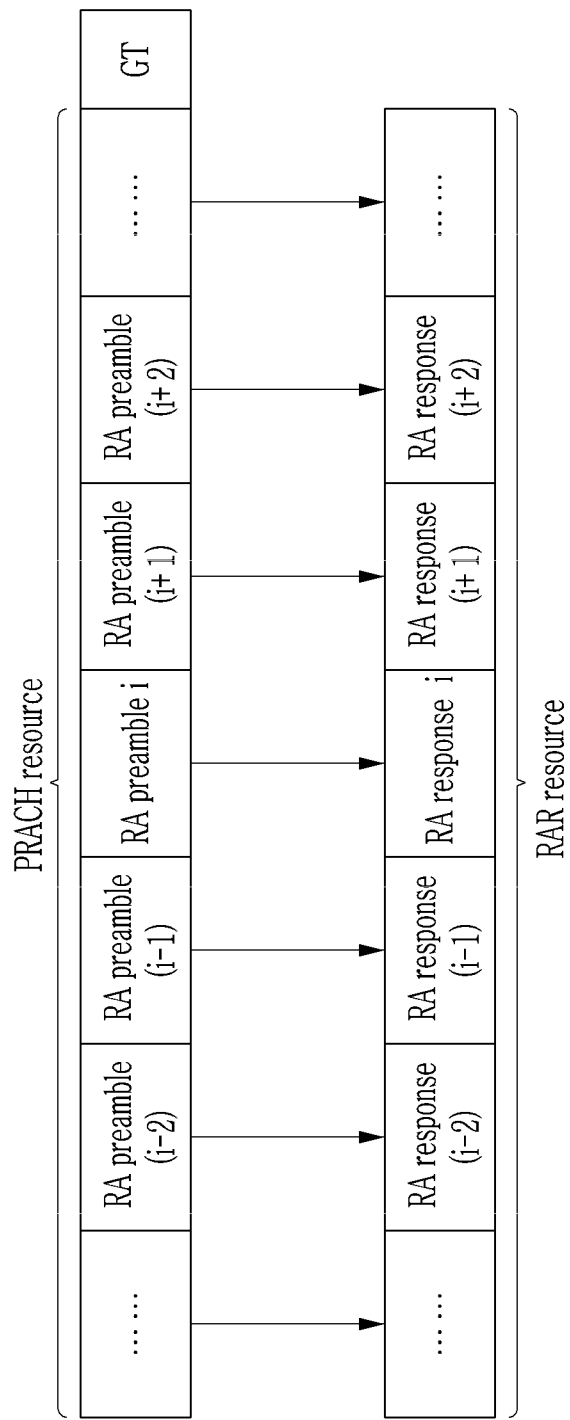
FIG. 9 shows an association between PRACH resources and random access response (RAR) in beam grouping according to a third exemplary embodiment of the present invention.

FIG. 9 shows an association between PRACH resources and RARs in beam grouping according to a third exemplary embodiment of the present invention.

As shown in FIG. 9, in the third exemplary embodiment of the present invention, a one-to-one mapping relationship as shown in FIG. 9 may be used to feed back UR Rx beam index information between a terminal and a base station.

In the third exemplary embodiment of the present invention, the RAR resources are mapped one-to-one with the PRACH resource. That is, as shown in FIG. 9, one RAR resource on which a RAR is transmitted may correspond to one RA preamble resource in the PRACH resource. In other words, the RAR is beam-specific.

Figure 10:
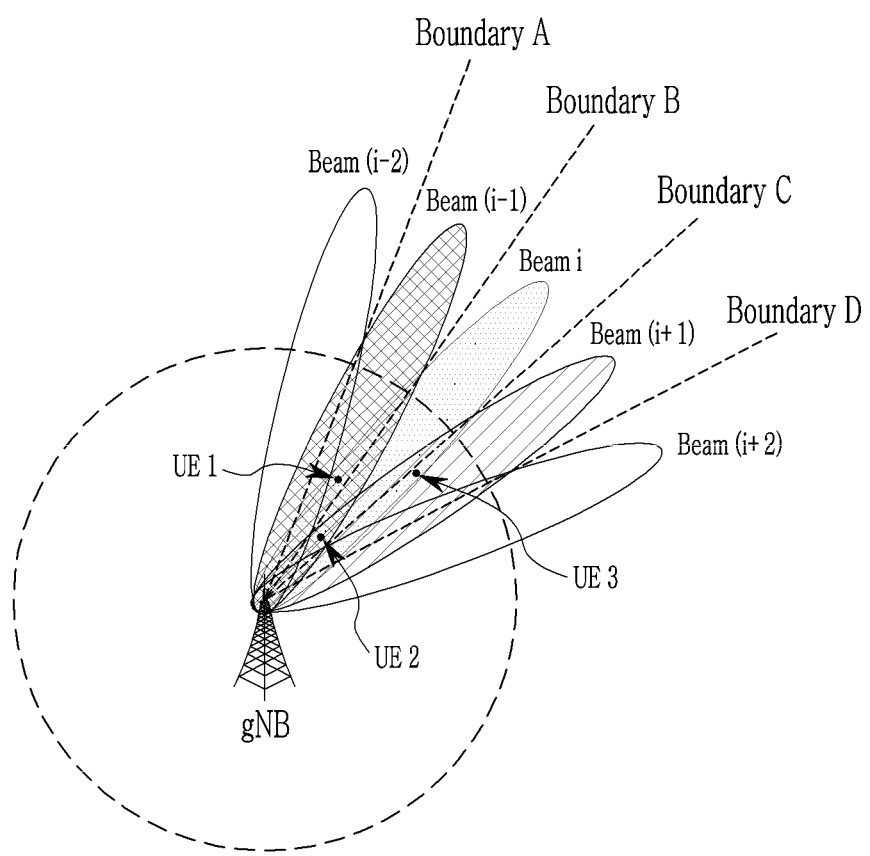
FIG. 10 shows an example of multi-beam directions according to an exemplary embodiment of the present invention.

FIG. 10 shows an example of multi-beam directions according to an exemplary embodiment of the present invention.

As shown in FIG. 10, it is assumed that there are three terminals located in different coverages. Regardless of beam correspondence at the base station, three terminals may use different RA preamble resources to transmit a preamble message (Msg.1). Here, it is assumed that the length of the RA preamble format is "3" and that the PRACH resource occupied by the three terminals is as shown in FIG. 11.

Figure 11:
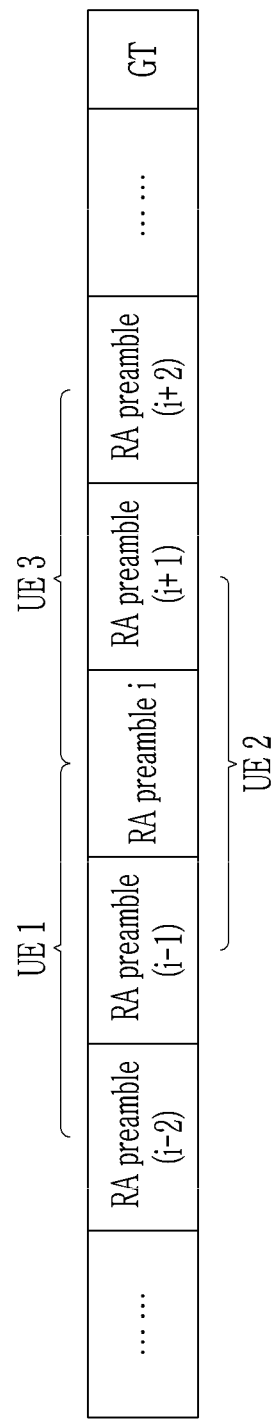
FIG. 11 shows an example of a structure of a PRACH resource occupied by three terminals according to an embodiment of the present invention.

FIG. 11 shows an example of a structure of a PRACH resource occupied by three terminals according to an embodiment of the present invention.

The terminals UE1, UE2, and UE3 occupy RA preamble resources of a fixed length (e.g., 3) in the PRACH resource, as illustrated in FIG. 11.

For example, the optimal DL Tx beam for a terminal UE1 is beam i−1, the optimal DL Tx beam for a terminal UE2 is beam i, and the optimal DL Tx beam for a terminal UE3 is beam i+1. However, since beam sweeping at a base station is essential for Rx beam calibration, the optimal UL Rx beams for the terminals UE1 to UE3 may differ from their optimal DL Tx beams.

In the case of receiving three preamble messages from the terminals UE1 to UE3, since the terminal UE1 is located in the area where the beam i−1 and the beam i overlap each other, a base station detects a preamble message (Msg.1) from the terminal UE1 on the (i−1)th and the i-th RA preamble resources. Further, since the terminal UE2 is located in the area where three beams (the beam i−1, the beam i, and the beam i+1) overlap each other, a base station detects a preamble message (Msg.1) from the terminal UE2 on the (i−1)th, the i-th and the (i+1)th RA preamble resources. Further, since the terminal UE3 is located in the area where the beam i and the beam i+1 overlap each other, a base station detects a preamble message (Msg.1) from the terminal UE3 on the i-th and the (i+1)th RA preamble resources.

In the embodiment of the present invention, a two-stage RAR selection procedure is performed as follows so that the base station transmits one RAR to each of the terminals and the terminal may receive one RAR.

In the first RAR selection procedure, a beam specific RAR selection by a base station is performed.

The base station selects a beam index based on the maximum reception power, and transmits a RAR using resources corresponding to the selected beam index. That is, the base station may receive a plurality of preamble messages from terminals, and the base station selects the UL Rx beam index based on the preamble message having the maximum reception power. One RAR is transmitted through the RAR resource which corresponds to the RA preamble resource corresponding to the selected UL Rx beam index.

In the second RAR selection procedure, beam specific RAR selection by a terminal is performed.

A terminal may receive a plurality of RARs. When a plurality of RARs correspond to different preamble sequences, the terminal may identify a correct RAR for the preamble message transmitted by the terminal based on the preamble sequence used by the terminal. When a plurality of RARs correspond to the same preamble sequence, the terminal selects one RAR among a plurality of RARs based on the maximum reception power.

The maximum reception power is used as a condition for RAR selection in the embodiment of the present invention, but the present invention is not limited to this.

The specific two-stage RAR selection process is described using an example.

It is assumed that a base station selects the (i−1)th beam as the optimal UL Rx beam for the terminal UE1 and selects the i-th beam as the optimal UL Rx beam for the terminals UE2 and UE3 through beam sweep. In this case, the base station may select the optimal UL Rx beam for the terminals based on the maximum reception power.

After the first RAR selection procedure at the base station, the base station feeds back the RAR using the RAR resources corresponding to the RA preamble resources of the PRACH resource based on the association between the PRACH resource and the RAR resources (refer to FIG. 9). Specifically, based on the optimal UL Rx beam index, the base station feeds back the RAR to the terminal UE1 using the (i−1)th RAR resource corresponding to the (i−1)th RA preamble resource, and feeds back a combined RAR for the terminal UE2 and the terminal UE3 using the i-th RAR resource corresponding to the i-th RA preamble resource. In transmitting the combined RAR on the same resource, a method used in a conventional mobile communication system (e.g., the LTE system) may be used.

As different terminals transmit preamble messages (Msg.1) using different RA preamble resources, each terminal will monitor resources with a RAR window. The RAR window covers the duration of the multiple RAR resources corresponding to the used RA preamble resources. For example, based on FIG. 11, the terminal UE1 monitors the RAR window covering the RAR resources (i−2, i−1, i), the terminal UE2 monitors the RAR window covering the RAR resources (i−1, i, i+1), and the terminal UE3 monitors the RAR window covering the RAR resources (i, i+1, i+2). The terminal UE1 receives the RAR on the (i−1)th RAR resource and receives the combined RAR on the i-th RAR resource. The terminals UE1 and the UE2 receive the RAR on the (i−1)th RAR resource and the combined RAR on the i-th RAR resource, and the terminal UE3 receives the combined RAR on the i-th RAR resource.

If all three terminals transmit a preamble message (Msg.1) using a different preamble sequence, the terminals receive multiple RARs. In the embodiment of the present invention, even if the terminal receives a plurality of RARs, the terminal may select a correct RAR for the preamble message transmitted by the terminal based on its own preamble sequence through the second RAR selection procedure in the terminal.

Based on the preamble sequence used by the terminal UE1, the terminal UE1 may immediately recognize that the RAR on the i-th RAR resource is a correct RAR. Similarly, when the terminal UE2 receives the RAR on the (i−1)th RAR resource and receives the combined RAR on the i-th RAR resource, the terminal UE2 may immediately recognize that the combined RAR of the i-th RAR resource is a correct RAR. The terminal UE 3 may also recognize that the combined RAR on the i-th RAR resource is a correct RAR.

Here, all terminals are able to know the optimal UL Rx beam at the base station based on the association between the PRACH resource and the RAR resources according to an exemplary embodiment of the present invention. That is, it can be seen that the (i−1)th beam is the optimal UL Rx beam at the base station for the terminal UE1, and the i-th beam is the optimal UL Rx beam at the base station for the terminals UE2 and UE3.

If all three terminals transmit the messages using the same preamble sequence, the second RAR selection procedure performed on the terminal side may be performed based on another condition. For example, a terminal may select one RAR from a plurality of RARs based on the maximum RAR reception power. As only the RAR transmitted through the correct beam is likely to reach the terminal with the maximum reception power, a RAR can be selected based on the maximum RAR reception power.

If the terminal UE1 receives a RAR on the (i−1)th RAR resource and receives the combined RAR on the i-th RAR resource, the RAR of the (i−1)th RAR resource is more likely to have higher power than the combined RAR of the i-th RAR resource. Therefore, the terminal UE1 may recognize the RAR of the (i−1)th RAR resource having the maximum RAR reception power as a correct RAR. Even in the case of the terminals UE2 and UE3, the combined RARs of the i-th RAR resources having comparable reception power levels are received and then the correct RARs for the terminals UE2 and UE3 can be recognized.

Figure 12:
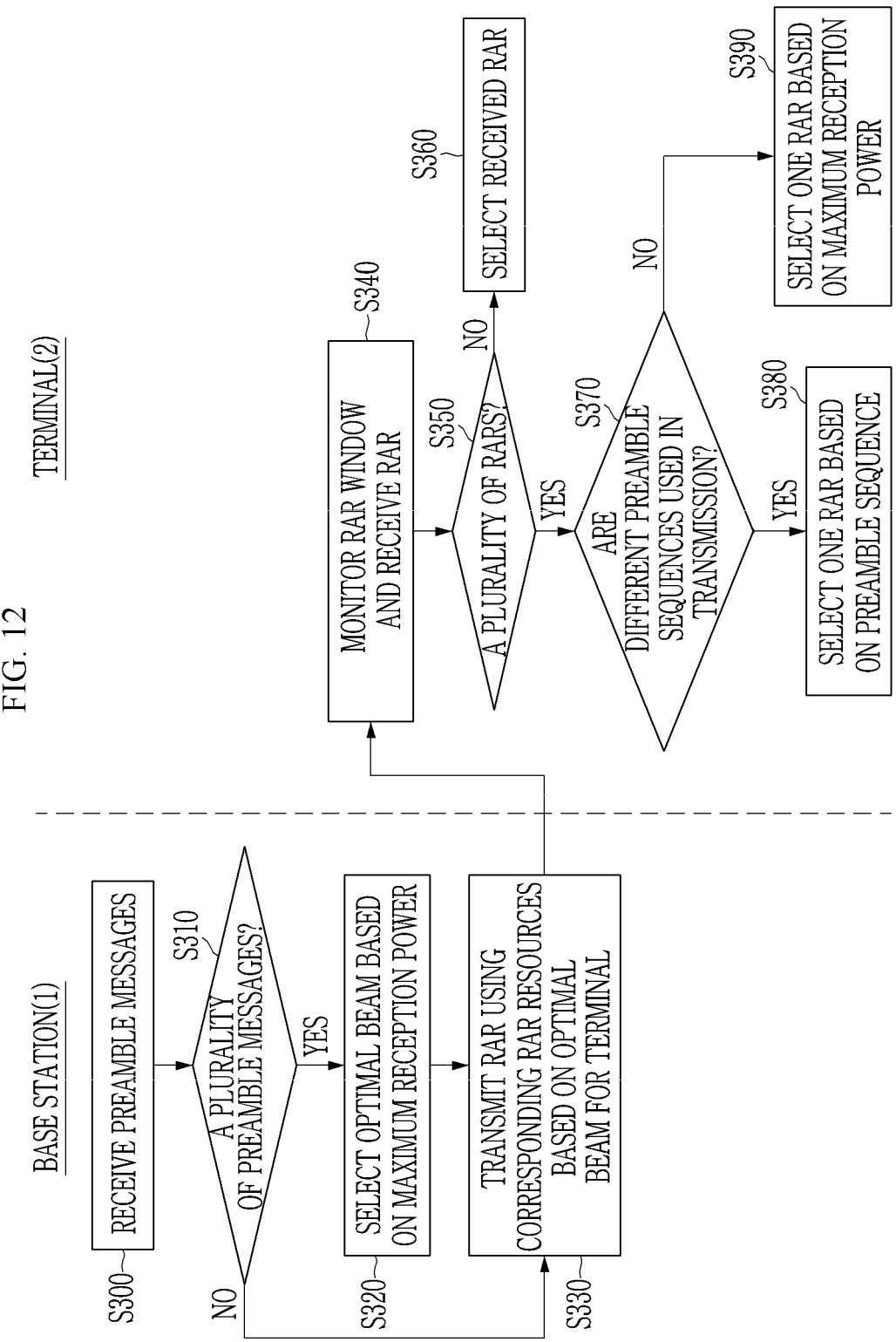
FIG. 12 shows a flowchart of a method for random access according to the third exemplary embodiment of the present invention.

FIG. 12 shows a flowchart of a method for random access according to a third exemplary embodiment of the present invention.

A base station 1 is hearing preamble messages (Msg.1) from one or multiple potential terminals within the coverage (S300), and when receiving a plurality of preamble messages from a terminal, the base station 1 selects an optimal UL Rx beam for a terminal based on the maximum reception power (S310 and S320). That is, the beam corresponding to the RA preamble resource on which the preamble message having the maximum reception power is transmitted is selected as the optimal UL Rx beam.

Based on the association between the PRACH resource and the RAR resources (refer to FIG. 9), the base station 1 transmits a RAR using the RAR resource corresponding to the RA preamble resource of the PRACH resource based on the selected optimal UL Rx beam (S330). When one preamble message is received from a terminal, the beam corresponding to the RA preamble resource on which the received preamble message is transmitted is selected as the optimal UL Rx beam.

Terminal 2 monitors the RAR window and receives the RAR from the base station 1 (S340). When receiving one RAR, the received RAR is selected (S350).

When receiving a plurality of RARs (S360), if terminals transmitted preamble messages using different preamble sequences (S370), the terminal 2 selects one RAR from the received plurality of RARs based on the transmitted preamble sequence.

When receiving a plurality of RARs (S360), if terminals transmitted preamble messages using the same preamble sequence (S370), the terminal 2 selects a RAR having the maximum reception power from the plurality of RARs (S390).

In the embodiments of the present invention, all terminals can know the optimal UL Rx beam at the base station based on the resource association according to the embodiment of the present invention. That is, for the terminal UE1, the (i−1)th beam corresponding to the selected RAR is the optimal UL Rx beam at the base station, and for the terminals UE2 and UE3, the i-th beam corresponding to the selected RAR is the optimal UL Rx beam.

Based on the association between the SS block, RA preamble resources, and beam-specific RARs according to an exemplary embodiment of the present invention, the terminal can identify and double check whether there is a beam correspondence at the base station. For example, if the terminal recognizes that the optimal DL Tx beam index (as seen by SS block detection) is the same as the optimal UL Rx beam index (as seen by RAR resource index detection), it may be seen that there is beam correspondence. If the information about whether or not there is beam correspondence at a base station is not broadcasted, the terminal can know the beam correspondence of the base station through the method described above.

In addition, the case in which the system information is wrongly detected based on the association between the SS block, the RA preamble resource, and the beam-specific RAR can be recognized according to an exemplary embodiment of the present invention. For example, some terminals may detect erroneous information, even though beam correspondence information has been sent to terminals. In this case, a terminal may double check the beam correspondence at a base station based on the association according to an exemplary embodiment of the present invention, and further, beam correspondence may be reconfigured based on the method according to an exemplary embodiment of the present invention.

In exemplary embodiments of the present invention, an SS block may carry DL beam index information of a base station and a terminal detects the SS block corresponding to its direction and obtains the DL beam index information of the base station based on the detected SS blocks.

In a case in which there is only an SSB (SS block) index but no beam index information included explicitly in SSB, a terminal may detect the SSB index and feedback the detected SSB index to a base station through preamble resources used for Msg. 1 transmission. Since a base station knows which 1 or 1 group of beams are used for sending this specific SSB, then the base station knows the beam index of the optimal DL Tx beam for the terminal.

Further, in another case in which both SSB index and beam index information are included in SSB contents explicitly, a terminal may know both of them by detecting the SSB. The terminal may need to feedback both SSB index as well as beam index (or one of these two) to inform a base station of the optimal DL Tx beam information through preamble resources used for Msg. 1 transmission.

As above, a terminal may detect a SSB index with or without additional beam index by detecting a SSB and the obtaining of beam index information from a SSB may includes these two cases in exemplary embodiments of the present invention.

The beam index in exemplary embodiments of the present invention may be a beam index, but also may be a beam group index when a group of beams (multiple beams) are transmitting the same SSB simultaneously. In this case, it may be understand that the group of beams is equivalent to a wider single beam.

In addition, when the same SSB is transmitted through multiple beams, the SSB may be beam-group specific. In this case, a terminal may only find the optimal DL Tx beam groups (or a DL wider beam) instead of a specific accurate (or narrow) beam. Also, in this case, it may be considered that the DL beam calibration is not fully done, and further procedure for finding out the exact DL Tx beam for the terminal may be performed.

Figure 13:
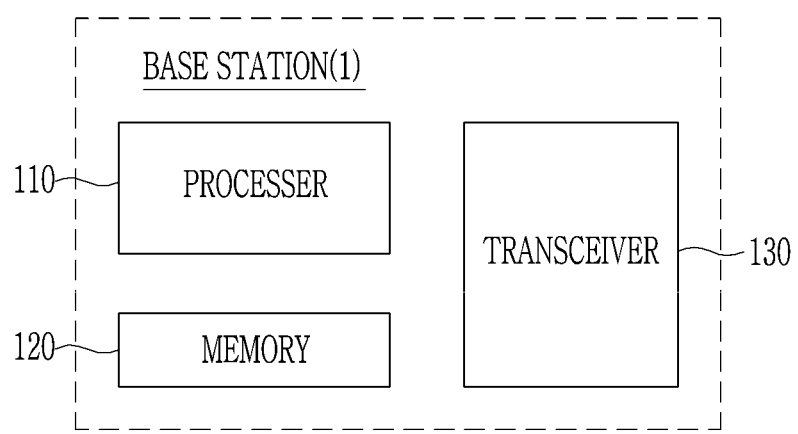
FIG. 13 shows a structure of a base station according to an exemplary embodiment of the present invention.

FIG. 13 shows a structure of a base station according to an exemplary embodiment of the present invention.

As shown in FIG. 13, a base station 1 according to an exemplary embodiment of the present invention includes a processor 110, a memory 120, and a transceiver 130. The processor 110 may be configured to implement the methods described with reference to FIG. 1 or FIG. 12.

The memory 120 is connected to the processor 110, and stores various kinds of information related to operations of the processor 110 therein. The memory 120 may store instructions that are to be executed in the processor 110 therein or load and temporally store instructions from a storage unit (not shown) therein. The processor 110 may execute the instructions stored or loaded in the memory 120. The processor 110 and the memory 120 are connected to each other through a bus (not shown), and input and output interfaces (not shown) may also be connected to the bus.

The transceiver 130 may be configured to transmit/receive a signal, and for example, to receive a preamble message and to transmit a RAR.

Figure 14:
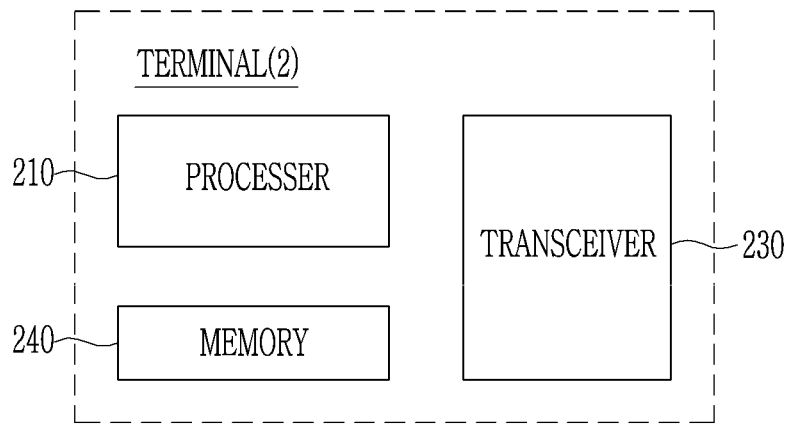
FIG. 14 shows a structure of a terminal according to an exemplary embodiment of the present invention.

FIG. 14 shows a structure of a terminal according to an exemplary embodiment of the present invention.

As shown in FIG. 14, a terminal 2 according to an exemplary embodiment of the present invention includes a processor 210, a memory 220, and a transceiver 230. The processor 210 may be configured to implement the methods described with reference to FIG. 1 or FIG. 12.

The memory 220 is connected to the processor 210, and stores various kinds of information related to operations of the processor 210 therein. The memory 220 may store instructions that are to be executed in the processor 210 therein or load and temporally store instructions from a storage unit (not shown) therein.

The processor 210 may execute the instructions stored or loaded in the memory 220. The processor 210 and the memory 220 are connected to each other through a bus (not shown), and input and output interfaces (not shown) may also be connected to the bus.

The transceiver 230 may be configured to transmit/receive a signal, and for example, to transmit a preamble message and to receive a RAR.

According to an exemplary embodiment of the present invention, an association between signals and resources for random access in a mobile communication system using multi-beams, that is, an association among a synchronization signal block, a preamble resource, and a random access response (RAR) is designed, and it is possible to perform random access based on the association.

Particularly, a preamble message with fixed length for practical implementation for a plurality of terminals is proposed and beam-specific RAR transmitting/receiving is performed. Thus, load balancing for a physical random access channel (PRACH) and RAR resources for a plurality of terminals is realized.

Further, through 2-stage RAR selection by a base station and a terminal, the terminal may identify a correct RAR among a plurality of RARs.

Further, resource allocation in a random access (RA) procedure based on the association between signals and resources for random access is performed, thereby allowing transmitting/receiving through efficient resources and reducing complexity and latency.

In addition, a procedure for detecting PRACH in a base station becomes simple and detection complexity is reduced.

Further, a terminal may recognize and double check where there is beam correspondence at a base station.

The exemplary embodiments of the present invention described above are not implemented only through the apparatus and/or the method described above, but may also be implemented through programs executing functions corresponding to configurations of the exemplary embodiments of the present invention, a recording medium in which the programs are recorded, and the like. In addition, these implementations may be easily made by those skilled in the art to which the present invention pertains from the exemplary embodiments described above. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for random access in a multi-beam-based mobile communication system, comprising:
   receiving, by a terminal, a plurality of synchronization signal blocks from a base station;
   obtaining, by the terminal, a beam index and a beam group index included in one synchronization signal block among the received plurality of synchronization signal blocks;
   identifying, by the terminal, a random access resource associated with the beam group index which indicates a first beam group to which a first beam used for transmitting the one synchronization signal block belongs;
   identifying, by the terminal, a plurality of preamble resources included in the random access resource based on the beam index indicating the first beam; and
   transmitting, by the terminal, a preamble message using the plurality of preamble resources to the base station,
   wherein each of the plurality of synchronization signal blocks is specified for one beam and the plurality of preamble resources are used for transmitting the preamble message by the terminal.

2. The method of claim 1, wherein the terminal recognizes the first beam corresponding to the obtained beam index as an optimal downlink transmission beam, and
   the plurality of preamble resources includes a central preamble resource corresponding to the beam index and preamble resources which are located prior to and after the central preamble resource corresponding to the beam index.

3. The method of claim 1, wherein a beam specified for a preamble resource located in a middle among the plurality of preamble resources on which the preamble message is transmitted is recognized by the base station as an optimal downlink transmission beam for the terminal.

4. The method of claim 1, wherein, when beam grouping is performed, a burst including the plurality of synchronization signal blocks corresponds to one random access resource, and the plurality of synchronization signal blocks of the burst correspond to different preamble resources in the random access resource.

5. The method of claim 1, wherein the obtaining of the beam index and the beam group index comprises:
   selecting, by the terminal, the one synchronization signal block corresponding to a direction of the terminal from among the plurality of synchronization signal blocks; and
   decoding, by the terminal, the selected one synchronization signal block to obtain the beam index and the beam group index.

6. The method of claim 1, wherein the random access resource includes the plurality of preamble resources and a guard time (GT) resource, and
   wherein the transmitting of the preamble message comprises, when an optimal beam recognized according to the beam index is an initial or last beam and a length of the preamble message is predetermined, selecting preamble resources from a first preamble resource or a last preamble resource of the random access resource by the length of the preamble message and transmitting the preamble message by using the selected preamble resources.

7. The method of claim 1, further comprising: after the transmitting of a preamble message,
   receiving, by the terminal, at least one random access response (RAR) transmitted on RAR resources selected through a RAR selection procedure from the base station;
   selecting, by the terminal, a RAR from among a plurality of RARs when receiving the plurality of RARs; and
   recognizing, by the terminal, that a beam corresponding to the selected RAR is an optimal uplink reception beam.

8. The method of claim 7, wherein a RAR resource is specified to one beam and corresponds to one preamble resource of the random access resource, and
   wherein the selecting of a RAR from among a plurality of RARs comprises,
   when a plurality of terminals are respectively located in different cover ridges and each terminal transmits a preamble message including a different preamble sequence, selecting one RAR from among the plurality of RARs based on a preamble sequence used in the preamble message transmission.

9. The method of claim 7, wherein a RAR resource is specified to one beam and corresponds to one preamble resource of the random access resource, and
   wherein the selecting of a RAR from among a plurality of RARs comprises,
   when a plurality of terminals are respectively located in different cover ridges and each terminal transmits a preamble message including a same preamble sequence, selecting one RAR having maximum reception power.

10. The method of claim 7, wherein the RAR selection procedure at the base station is performed based on a preamble message having maximum reception power among a plurality of preamble messages, and a beam corresponding to a preamble resource on which the preamble message having maximum reception power is transmitted is selected as an optimal beam, and wherein the RAR from the base station is transmitted on RAR resources corresponding to the selected optimal beam.

11. A method for random access in a multi-beam-based mobile communication system, comprising:
   transmitting, by a base station, a plurality of synchronization signal blocks;
   monitoring, by the base station, a plurality of preamble resources associated with each of the plurality of synchronization signal blocks;
   receiving, by the base station, a preamble message in the plurality of preamble resources associated with one synchronization signal block among the plurality of synchronization signal blocks from a terminal; and
   recognizing, by the base station, a first beam specified to the one synchronization signal block corresponding to the plurality of preamble resources, the preamble message being received on the plurality of preamble resources, as an optimal downlink transmission beam for the terminal,
   wherein a random access resource includes the plurality of preamble resources, the one synchronization signal block is specified for one beam, the plurality of preamble resources are used for transmitting the preamble message by the terminal, each of the plurality of synchronization signal blocks includes a beam index and a beam group index, the beam index included in the one synchronization signal block indicates the first beam, the beam group index included in the one synchronization signal block indicates a first beam group to which the first beam belongs, the first beam group is associated with the random access resource, and the first beam is associated with the plurality of preamble resources included in the random access resource.

12. The method of claim 11, wherein the recognizing comprises recognizing the first beam specified for the one synchronization signal block corresponding to a preamble resource located in a middle among the plurality of preamble resources on which the preamble message is received as the optimal downlink transmission beam for the terminal.

13. The method of claim 11, wherein the plurality of preamble resources includes a preamble resource corresponding to the beam index included in the one synchronization signal block and preamble resources which are located prior to and after the preamble resource corresponding to the beam index.

14. The method of claim 11, further comprising:
   after the recognizing,
   selecting, by the base station, an optimal uplink reception beam for the terminal by beam sweeping; and
   transmitting, by the base station, a random access response (RAR) on RAR resources corresponding to the selected beam,
   wherein a RAR resource is specified to one beam and corresponds to one preamble resource of the random access resource.

15. The method of claim 14, wherein the selecting of the optimal uplink reception beam comprises selecting the optimal uplink reception beam based on maximum reception power.

16. A method for random access in a multi-beam-based mobile communication system, comprising:
   monitoring, by a terminal, resources with a resource window of a fixed length after transmitting a preamble message;
   receiving, by the terminal, a plurality of random access responses (RARs) transmitted on RAR resources selected through a RAR selection procedure from the base station according to the monitoring;
   selecting, by the terminal, an RAR from among the plurality of RARs; and
   recognizing, by the terminal, that a beam corresponding to the selected RAR is an optimal reception beam of the terminal,
   wherein a random access resource includes a plurality of preamble resources, and each of the RAR resources is specified to different beams and corresponds to different preamble resources of the random access resource, and
   wherein in the selecting the RAR by the terminal, when each of a plurality of terminals including the terminal transmits the preamble message with a different preamble sequence, the terminal selects the RAR based on a preamble sequence used for transmitting the preamble message, and when each of the plurality of terminals transmits the preamble message with a same preamble sequence, the terminal selects an RAR among the plurality of RARs having a maximum reception power.

17. The method of claim 16, wherein
the plurality of terminals are respectively located in different cover ridges.

18. The method of claim 16, further comprising:
before the monitoring,
receiving, by the terminal, a synchronization signal block and obtaining beam index information from the received synchronization signal block; and
transmitting, by the terminal, the preamble message, the preamble message occupying the plurality of preamble resources, the plurality of preamble resources including a preamble resource corresponding to the beam index information to the base station,
wherein the synchronization signal block is specified for one beam or one beam group and corresponds to one preamble resource of the random access resource.

19. The method of claim 18, wherein the transmitting of the preamble message comprises transmitting the preamble message by using the plurality of preamble resources including a preamble resource corresponding to the beam index information and preamble resources which are located on a left and right of the preamble resource corresponding to the beam index information.

* * * * *